Feb. 23, 1943.　　　　B. DIBNER　　　　2,312,240
NUT RETAINER FOR ELECTRICAL CONNECTORS
Filed July 7, 1939
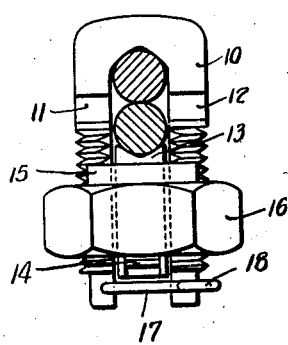
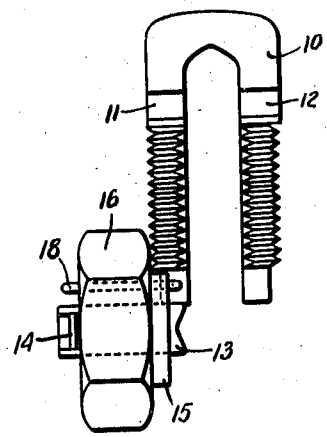
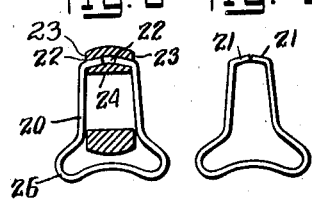
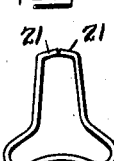
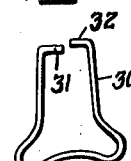
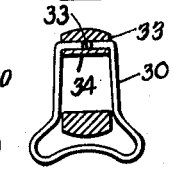
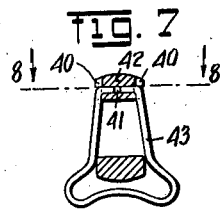
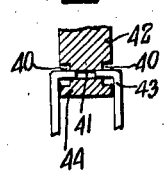
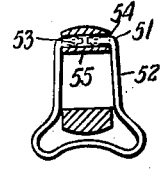
INVENTOR.
Bern Dibner
BY Harry Ernest Rubens
ATTORNEY.

Patented Feb. 23, 1943

2,312,240

UNITED STATES PATENT OFFICE 2,312,240

NUT RETAINER FOR ELECTRICAL CONNECTORS

Bern Dibner, Peekskill, N. Y.

Application July 7, 1939, Serial No. 283,172

5 Claims. (Cl. 85—3)

This invention relates to electrical connectors of the type generally designated as "service connectors." Such connectors usually consist of a slotted bolt, a nut which fits on the slotted bolt, and a pressure bar which fits in the slot of the bolt and has extensions which ride on the face of the nut. Usually the nut and pressure bar are assembled together in unitary rotatable relationship. Ordinarily the nut pressure bar assembly and the slotted bolt—when disengaged from each other—are separable units. The result is that parts may be dropped and lost—and inasmuch as both parts are essential for each unit, if either the slotted bolt or nut-pressure bar assembly is lost, the other part of the connector is useless and must be discarded. To eliminate this disadvantage, so-called nut-retainers have been devised.

My invention is an improvement on previously devised nut-retainers and eliminates many of the disadvantages inherent in them.

One object of my invention is to provide a nut retainer which will permit the nut-pressure bar assembly to swing sufficiently clear of the slot in the slotted bolt, to completely open the slot for the entrance of the conductors to be connected.

Another object of my invention is to provide a nut retainer which will not protrude beyond the ends of the legs of the slotted bolt, when the nut-pressure bar assembly and split bolt are assembled.

Another object of my invention is to provide a nut retainer which will not dangle loosely, but will remain firmly in place.

Still another object of my invention is to provide a nut retainer which will automatically close against the legs of the split bolt when the nut-pressure bar assembly is not suspended on it.

A large proportion of the split bolt service connectors which are installed by the electric utility companies are installed on live lines. The linemen who work with the connectors wear rubber gloves and over these they wear heavy canvas gloves. To handle small parts with these awkward gloves on is decidedly inconvenient. This is especially true when connections must be made on pole tops. At such locations, either the split bolt or nut-pressure bar assembly might be fumbled and dropped, in which event the lineman would discard the remaining part rather than climb down the pole to recover the dropped portion. The addition of nut retainers to the split-bolt connector eliminates such losses to a large extent.

Many of the service connectors that are used are taped up after installation. Any projection or dangling part is inconvenient to tape up and has a tendency to cut through the tape. It is, therefore, advisable to make the nut retainer so that it will not normally project beyond the leg of the split-bolt.

When a service connector is installed on a bare wire and is not taped up any loose or dangling part on a service connector swaying in the wind, etc. may cause radio interference and result in complaints which may prove very difficult and expensive for the electric utility to trace. The nut-retainer should be firmly, not loosely, assembled to the split-bolt at all times.

To depend on a lineman to snap or replace a nut retainer into position after installation of the connector, may very often result in misplaced confidence. The awkwardness of the working position and the clumsy gloves with which linemen work make it very difficult to handle such small parts as nut retainers. It is especially desirable that the nut-retainer automatically return to its closed position and stay there after the nut-pressure bar assembly has been screwed onto the split bolt.

I accomplish these and other objects and obtain my new results as will be apparent from the device described in the following specification, particularly pointed out in the attached claims, and illustrated in the accompanying drawing, in which:

Fig. 1 is a side view of my nut-retainers mounted on a split bolt.

Fig. 2 is a side view of the nut-retainer supporting the nut and follower assembly.

Fig. 3 is a sectional view through the end of the legs of the split bolt, illustrating the mounting of the one form of nut retainer.

Fig. 4 is the same nut retainer removed from the assembly.

Fig. 5 is a modification before assembly.

Fig. 6 is the same assembled.

Fig. 7 is a sectional view through the ends of the legs of the split bolt illustrating another form.

Fig. 8 is a view of the same, taken along the line 8—8 of Fig. 7, the nut retainer opened transversely.

Fig. 9 is a sectional view through the ends of the legs of the split bolt of an additional modification.

In the figures, reference numeral 10 designates a split bolt having threaded legs 11 and 12, pressure bar 13, with nut retaining projections 14 and 15 extending therefrom within which nut 16 is rotatably mounted.

In Figs. 1 and 2, a wire type nut retainer 17 is shown having a head 18 for capturing the nut 16.

The nut retainers illustrated are of the type which will maintain themselves in the closed position, i. e., across the slot of the split bolt, as shown in Fig. 1, by reason of their hinge construction.

In Figs. 3 and 4, a self-closing type is shown operating through the torsion created in the two ends of the wire. This type of wire nut retainer 20 is formed with a looped shaped head 26 to engage the nut 16 in the open position shown in Fig. 2. The two ends 21 are inwardly bent forming an angle in the plane of the nut retainer. These ends are inserted into holes 22 drilled in a corresponding angle on each side 23 of the leg 24 about which the nut retainer is hinged. When the head 26 of the nut retainer 20 is lifted about the leg 24, the two ends 21 will be maintained in their original position producing a torsional spring effect and causing the head to resume its normal position in the plane of the two pointed ends, when the pressure is released on the head.

In Fig. 5, a spring wire 30 is shown having ends 31 and 32 slightly offset from one another. When these two ends are inserted into holes 33 of the leg 34, the offset ends frictionally engage the walls of the holes 33, as shown in Fig. 6, resisting movement, and causing the nut retainer to maintain any position to which it is rotated.

In Figs. 7 and 8, another modification is shown. A slot 40 is cut on each side of the holes 41 in the leg 42, permitting the wire nut retainer 43 to fall into the slot when in the same plane. Lifting the nut retainer to a transverse position, as shown in Fig. 8, will force the uncut leg portion 44 to act as a cam spreading the nut retainer legs 45 and 46 slightly apart in a spring action. In the position shown in Fig. 8, the nut retainer is in dead center, and any deviation therefrom will cause the ends to assume the position indicated in either Fig. 1 or 2, depending on the direction taken.

In Fig. 9, the two ends 51 of the wire nut retainer 52 are swedged as at 53 to increase their diameter slightly for frictionally engaging the walls of the holes 54 of the leg 55. Then the nut retainer will frictionally maintain itself in the position to which it is moved.

The foregoing types of nut retainers are all adapted to maintain themselves in closed position, that is extending from one leg of a split bolt transversely across the slot without engaging the other leg, thus eliminating the disadvantage inherent in loosely supported types. The nut retainers will maintain the closed position by reason of their mounting on the leg of the split bolt to which they are connected.

I have thus described my invention, but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claims, and by means of which, objects of my invention are attained and new results accomplished, as it is obvious that the particular embodiments herein shown and described are only some of the many that can be employed to attain these objects and accomplish these results.

What I claim and desire to secure by Letters Patent, is as follows:

1. In a split bolt connector having two legs with threaded sections, and a nut threadedly engaging the same, a wire nut retainer having its free ends contained completely within apertures positioned on the end of one of the legs, with an enlarged head for capturing the nut when removed from the threaded sections, the completely covered free ends of the wire nut retainer provided with means for maintaining said nut retainer in closed position.

2. In a split bolt connector having two legs with threaded sections and a nut threadedly engaging the same, a nut retainer having a hinged connection on the end of one of the legs with an enlarged head for capturing the nut when removed from the threaded sections, said hinged connection adapted to automatically return said nut retainer to the closed position when the nut re-engages the legs of the split bolt.

3. In a split bolt connector having two legs with threaded sections and a nut threadedly engaging the same, a wire nut retainer having its two ends pointed towards each other and at an angle, and inserted into corresponding apertures in the end of one of the legs; an enlarged head for capturing the nut when removed from the threaded sections, said nut retainer adapted to automatically return itself to the closed position when the nut re-engages the legs of the split bolt.

4. In a split bolt connector having two legs with threaded sections and a nut threadedly engaging the same, a wire nut retainer having its two ends pointed towards each other and inserted into corresponding apertures of one of the legs, an enlarged head for capturing the nut when removed from the threaded sections, camming means associated with said leg for spreading apart, the two ends of the nut retainer when in a position transverse to the closed position, whereby said nut retainer will maintain itself in the closed position when the nut re-engages the legs of the split bolt.

5. In a split bolt connector having two legs with threaded sections and a nut threadedly engaging the same, a wire nut retainer having its two ends pointed towards each other and swedged to frictionally engage the walls of an aperture drilled through the end of one of the legs of the split bolt whereby the nut retainer will maintain itself in any pre-set position on the leg of the split bolt, said nut retainer having an enlarged end for retaining the nut when removed from the split bolt.

BERN DIBNER.